United States Patent [19]

Otten et al.

[11] E Re. 30,726

[45] Reissued Sep. 1, 1981

[54] POLYMER FILM HAVING LINEAR TEAR PROPERTIES

[75] Inventors: Norman J. Otten, Prospect Heights; Eldrige H. Presnell, Round Lake, both of Ill.

[73] Assignee: Tower Products, Inc., Mundelein, Ill.

[21] Appl. No.: 82,992

[22] Filed: Oct. 9, 1979

Related U.S. Patent Documents

Reissue of:

[64] Patent No.: 4,098,406
Issued: Jul. 4, 1978
Appl. No.: 713,703
Filed: Aug. 12, 1976

U.S. Applications:

[63] Continuation-in-part of Ser. No. 486,082, Jul. 5, 1974, abandoned.

[51] Int. Cl.[3] ..... B65D 33/00; B29C 17/06; B32B 27/08

[52] U.S. Cl. ..... 206/601; 206/604; 229/DIG. 5; 264/176 R; 264/210.1; 428/35; 428/515; 428/516; 428/523

[58] Field of Search ..... 525/221, 201, 196; 428/35, 515, 516, 523; 264/171, 176 R, 512, 563; 229/DIG. 5; 206/601, 604

[56] References Cited

U.S. PATENT DOCUMENTS

| | | | |
|---|---|---|---|
| 3,264,272 | 8/1966 | Rees | 428/523 |
| 3,340,091 | 9/1967 | Zweig | 428/195 |
| 3,347,957 | 10/1967 | Adomaitis et al. | 525/221 |
| 3,365,520 | 1/1968 | Foster et al. | 525/221 |
| 3,422,055 | 1/1969 | Maloney | 525/221 |
| 3,437,718 | 4/1969 | Rees | 525/221 |
| 3,535,409 | 10/1970 | Rohde | 206/620 |
| 3,552,638 | 1/1971 | Quackenbush | 206/631 |
| 3,704,157 | 11/1972 | McDonald | 428/351 |
| 3,709,957 | 1/1973 | Brebner | 525/221 |
| 3,819,792 | 6/1974 | Ono et al. | 525/221 |
| 3,900,635 | 8/1975 | Funderburk, Jr. et al. | 428/213 |
| 3,923,574 | 12/1975 | Vercauteren | 428/522 |
| 3,952,073 | 4/1976 | Isaka et al. | 525/221 |
| 3,988,499 | 10/1976 | Reynolds | 428/523 |
| 4,051,993 | 10/1977 | Castoldi, Jr. | 206/604 |
| 4,188,441 | 2/1980 | Cook | 525/196 |

FOREIGN PATENT DOCUMENTS 1145053 3/1969 United Kingdom .

*Primary Examiner*—William R. Dixon, Jr.
*Attorney, Agent, or Firm*—Lee, Smith & Jager

[57] ABSTRACT

Certain blends or mixtures of polyethylene and ionomer resins are blow extruded to make a film having excellent linear tear properties in the direction of extrusion, which property is not found in films of either of the resins alone.

14 Claims, No Drawings

POLYMER FILM HAVING LINEAR TEAR PROPERTIES

Matter enclosed in heavy brackets [ ] appears in the original patent but forms no part of this reissue specification; matter printed in italics indicates the additions made by reissue.

CROSS REFERENCE

This is a continuation-in-part of our copending application Ser. No. 486,082, filed July 5, 1974 now abandoned.

BACKGROUND OF THE INVENTION

Various polymer films are used to make bags, pouches, packages and the like. A common practice is to join opposed polymer sheets together along a common line by heat sealing, wherein the sheets are pressed together between heated bars for a sufficient length of time and with sufficient pressure to cause fusion therebetween.

If a bag or package composed of a polymer film is heat sealed together on all sides, difficulties are frequently encountered in tearing the bag open. Many polymer films tend to stretch before tearing. Moreover, most films will not tear along a straight line, which presents a problem in opening of a bag or package.

A conventional method of forming polymer films is by blow extrusion, wherein the polymer is melted and forced through a circular die to produce a thin tube, which is inflated with a gas in the vicinity of the die and drawn away in a continuous process. Widely used polymers include low density polyethylene, usually modified with vinyl acetate, as well as ionomers, both of which provide a film having good heat sealing properties and excellent strength. Films composed entirely of either an ionomer or low density polyethylene, however, made by normal blow or other extrusion methods, cannot be torn along a straight line in the direction of extrusion. The film can be torn in such direction only with great difficulty and not in a straight line.

SUMMARY OF THE INVENTION

The present invention is based on the discovery that a film made from certain blends of polyethylene and an ionomer, containing a particular minimum amount of either, unexpectedly exhibits excellent linear tear properties in the direction of extrusion. The polyethylene-ionomer film contains from about 12 to about 95% ionomer and from about 5 to about 88% polyethylene, the blends in such ranges providing films having excellent properties as well as excellent linear tear qualities in the direction of extrusion.

DESCRIPTION OF THE PREFERRED EMBODIMENT

In accordance with the preferred embodiment, ionomer resin and polyethylene resin are mixed together in dry form in the desired proportions, melted, and then extruded through die in the form of a tubing or sheet, which in the case of a tubing, is inflated with a gas in the area of extrusion.

The term "ionomer" as used herein is characterized as a metal-containing ionic copolymer obtained by the reaction between ethylene or an alpha-olefin with an ethylenically unsaturated monocarboxylic acid such as acrylic or methacrylic acid wherein at least 10% of said carboxylic acid groups are neutralized by an alkali metal ion, and having a melting point range of from about 370° to 450° F. A suitable ionomer for making films is "SURLYN 1601" sold by E. I. DuPont De Nemours & Company.

U.S. Pat. No. 3,264,272 of record herein describes the types of ionomer resins that may be used in the practice of the present invention, and as used herein, the term "ionomer" shall be defined as the class of copolymers described in said patent. Such copolymers are more fully defined as ionic copolymers of a-olefins having the formula R—CH—$CH_2$, where R is a radical selected from the class consisting of hydrogen and alkyl radicals having from 1 to 8 carbon atoms, and a,B-ethylenically unsaturated carboxylic acids having from 3 to 8 carbon atoms, said copolymers having from 10% to 90% of the carboxylic acid groups ionized by neutralization with metal ions uniformly distributed throughout the copolymer, said copolymer being a direct copolymer of the a-olefins and the unsaturated carboxylic acid in which the carboxylic acid groups are randomly distributed over all molecules and in which (1) the a-olefin content of the copolymer is at least 50 mol percent, based on the a-olefin-acid copolymer, (2) the unsaturated carboxylic acid content of the copolymer is from 0.2 to 25 mol percent, based on the a-olefin-acid copolymer, and (3) any other monomer component optionally copolymerized in said copolymer is monoethylenically unsaturated, and said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions.

The term "polyethylene resin" includes polyethylene resins having a density in the range of from about 0.910 to about 0.960. The polyethylene may be modified to include from zero up to about 7.5% vinyl acetate as a copolymer, without adverse effect on the tear qualities of the resulting sheet. A suitable material is "Chemplex 3041" made by the Chemplex Corporation.

It has been found that either the ionomer or polyethylene may be used as a base, and beyond a particular minimum amount of the other polymer must be added to impart the desired tear qualities to the resulting film. If polyethylene is the base, a minimum of at least about 12% by weight of ionomer resin may be blended therewith to impart linear tear qualities. If ionomer resin is used as the base, a minimum of at least about 5% by weight polyethylene must be added. Since all intermediate levels result in the desired characteristic, the polymer blend may contain from about 12% to about 95% ionomer and from about 5% to about 88% polyethylene, although up to about 7.5% of the polyethylene contribution may comprise vinyl acetate to improve puncture resistance.

The term "linear tear property" as used herein means the inherent property or ability of the film to tear by hand along substantially a straight line, with less than about a 20°, and preferably less than 5° to 10° angle of deviation from said line after initiation of the tear. The tear is made by a normal shearing or parting motion without the necessity to guide or manipulate the direction of the tear along the line and without using guides or other external aids. The films of the present invention have the inherent quality of easily tearing in or parallel to the machine direction of the film in substantially a straight line. Once the tear has been initiated, preferably by slitting or nicking the film at one edge, continued tearing will result in a straight line tear, without stretching or distortion of the film, as if the material had been perforated or weakened along the line. This result is totally unexpected, since neither the pure polyethylene or ionomer films alone exhibit this property.

The degree of force required to make the tear is also a contributing factor of the present invention. If the tear strength, measured by the Elmendorf procedure, is substantially greater than 125 g, the film will offer excessive resistance to tearing, whereas too low a tear strength will result in a film that could too easily be torn accidentally during normal handling or use. The film of the present invention will exhibit a tear strength or a resistance to propagation of tear in the order of from about 30 g to about 125 g and preferably in the order of about 40 to about 100 grams, which is an ideal tear strength without encountering undue weakness or resistance to propagation of tear in the film.

After the polymers have been blended in the desired proportions, the mixture is preferably melted and blow extruded by conventional methods and at temperatures in the order of about 300° to about 425° F. The procedure results in the continuous production of tubular film, which may thereafter be slit longitudinally, cut into transverse sections, and heat sealed adjacent the transverse cuts to form an open end bag or pouch. Thereafter, any desired contents may be filled into the bag through the open end, and such end is then heat sealed.

In the alternative, the film of the present invention may be cast in the form of a sheet by convention methods, and the linear tear property will still be exhibited in the machine direction.

In the conventional fabrication of bags or pouches, the side seams run perpendicular to the direction of extrusion, and the remaining open end of the pouch is considered as the top, with the printing, labels, etc., being applied in the same orientation, i.e., along lines parallel with the direction of extrusion. Thus, the product of the present invention lends itself to the production of a pouch having a linear tear property across the top or bottom of the pouch. The finished pouch may also be provided with a notch at either side to facilitate initiation of the tear, corresponding to the direction of extrusion.

From the foregoing, the importance of providing a linear tear property in the machine direction can be readily appreciated since this is the direction from side to side of a conventionally fabricated pouch. Thus, the pouch may be grasped at a top corner and easily torn open. A notch is typically provided on one or both sides of the pouch whereby the tear may be conveniently initiated from either side.

It has also been found that polymers or blends that do not possess the linear tear property can be coextruded with the blends described herein, and the resulting multi-ply film will exhibit the desired linear tear property in the machine direction. For example, if one ply of the coextrusion comprises a linear tear blend, the second ply may be composed of low density polyethylene, polyethylene modified with vinyl acetate or polyisobutylene, or ionomer, or a blend of ionomer and polyethylene falling outside of the linear tear range described herein. As an example of the latter, the second ply may comprise a blend containing polyethylene and less than 12% ionomer.

A further benefit of the polymer composition of the present invention is that while the linear tear feature is exhibited, there is no detraction from the other properties that would normally be expected from the individual components. Thus, there is no loss of such properties such as stiffness modulus, impact strength or elongation, but rather an average of the properties of the individual components is realized.

In further illustration of the present invention, the following examples are given.

EXAMPLE I

Four batches of identical low density polyethylene containing 0, 2%, 4.5% and 7.5% vinyl acetate were dry blended with varying amounts of DuPont film grade Surlyn. The blends were each extruded through a 4 inch die at a 1.5 to 1 blow-up ratio under the following extrusion conditions: extruder L/D, 24 to 1; gauge, 3 mil., temperature at feed section of extruder, about 300° F.; temperature in extruder, from 320° to 360°; average temperature at front and die of extruder, about 400° F. The tube for each batch was flattened, and notched specimens tested for Elmendorf tear strength in the machine direction (ASTM D 1922–67, propagation tear resistance). The tear strength for each sample was measured as follows:

TABLE I

| (Remainder Polyethylene). % Vinyl Acetate | Elmendorf Tear (gm.) % Surlyn 0 | 10 | 25 | 50 | 75 | 100 |
|---|---|---|---|---|---|---|
| Homopolymer | —(P) | 120(G) | 64(E) | 68(E) | 82(E) | 189(P) |
| 2% Vinyl Acetate | 630(P) | 130(G) | 59(E) | 71(E) | 100(E) | —(P) |
| 4.5% Vinyl Acetate | 300(P) | 255(P) | 76(G) | 79(E) | 88(E) | —(P) |
| 7.5% Vinyl Acetate | —(P) | 194(P) | 67.6(P) | 62(P) | 84(G) | —(P) |

EXAMPLE II

Each of the samples of Example I was also tested for linear tear properties in machine direction based on the following criteria: less than 5° angular deviation from a straight line from side to side of the film, excellent (E); less than 20° deviation, good (G); and more than 30°, poor (P). The ratings for each sample are indicated adjacent the Elmendorf values in Table I.

EXAMPLE III

Several of the blends exhibiting excellent linearity were coextruded with a blend containing 5% ionomer and 95% low density polyethylene. The resultant multiply film exhibited excellent linear tear properties in accordance with the criteria of Example II.

EXAMPLE IV

Samples containing various mixtures of Chemplex L.D. 3041 polyethylene containing 3½% vinyl acetate and DuPont "surlyn" 1601 were blow extruded to determine the minimum amount of either resin required to achieve linear tear properties in accordance with the criteria of Example II. The tests included runs of 5%, 7½%, 10%, 12½% and 15% ionomer with the remainder as Chemplex, and 5%, 7½%, 10%, 12½% and 15%

Chemplex with the remainder as ionomer. It was found that the linear tear property was attained at a minimum of 12½% ionomer level with the remainder as polyethylene and at a minimum of 5% polyethylene with the remainder as ionomer.

What is claimed is:

1. A method of imparting linear tear properties in the direction of extrusion to a polymer film comprising the steps of preparing a blend of resins consisting essentially of from about 12% to about 95% ionomer resin and from about 5% to about 88% low density polyethylene resin, and extruding said blend of resins *at a stretch ratio of approximately 1.5 to 1* into a film[,] whereby said film exhibits linear tear properties in a direction parallel to the direction of extrusion *and an Elmendorf tear strength of from 30 to 125 g.*

2. The method of claim 1 wherein said polyethylene resin contains up to about 7.5% of ethylene-vinyl acetate copolymer.

3. The method of claim 1 wherein said blend of resins is blow extruded in the form of a tube.

4. The method of claim 1 wherein the density of said polyethylene resin is in the range of from about 0.910 to about 0.960.

5. The method of claim 1 wherein *a polymer* lacking linear tear properties selected from the group consisting of polyethylene, polyethylene modified with vinyl acetate, polyethylene modified with isobutylene, ionomer and an ionomerpolyethylene blend, is coextruded with said blend of resins to provide a coextruded film having linear tear properties in the direction of extrusion.

6. An extruded polymer film consisting essentially of from about 12% to about 95% of ionomer and the remainder as polyethylene having a density of from about 0.910 to about 0.960, said film being *extruded at a stretch ratio of approximately 1.5 to 1 and being* capable of being torn in substantially a straight line in the direction of extrusion at a deviation of less than 20° from said straight line, *said film having an Elmendorf tear strength of from 30 to 125 g.*

[7. The film of claim 6 wherein the Elmendorf tear strength of said film is less than 125 g.]

8. The film of claim [7] *6* wherein the Elmendorf tear strength of said film is from about 30 to about 125 g.

9. The film of claim 6 wherein said polyethylene contains up to about 7.5% vinyl acetate.

10. The film of claim 6 wherein said film is blow extruded.

11. The film of claim 6 wherein said film is coextruded with a second polymer film selected from the group consisting of polyethylene, polyethylene modified with vinyl acetate, polyethylene modified with isobutylene, ionomer and an ionomer-polyethylene blend.

12. A pouch composed of an extruded polymer film, said pouch having a top edge, bottom edge and side edges, said top and bottom edges being substantially parallel with the direction of extrusion of said film, the film of said pouch consisting essentially of from about 12% to about 95% ionomer with the remainder as polyethylene having a density of 0.910 to about 0.960 and containing from about zero to 7.5% vinyl acetate, *the film of said pouch being extruded at a stretch ratio of approximately 1.5 to 1 and having an Elmendorf tear strength of from 30 to 125 g,* said pouch being capable of being torn from side to side in substantially a straight line parallel with the direction of extrusion.

13. The pouch of claim 12 wherein said film is coextruded with a second polymer, said second polymer being selected from the group consisting of polyethylene, polyethylene modified with vinyl acetate, polyethylene modified with isobutylene, ionomer, and an ionomer-polyethylene blend.

14. A pouch comprising a blow extruded polymer tube section having open ends, said tube being heat sealed adjacent each open end to form an enclosure, said tube consisting essentially of from about 12% to about 95% ionomer with the remainder as polyethylene and zero to about 7½% vinyl acetate, the heat sealed edges of said tube being perpendicular to the direction of extrusion, *said tube being extruded at a stretch ratio of approximately 1.5 to 1 and having an Elmendorf tear strength of from 30 to 125 g,* said pouch being capable of being torn in substantially a straight line between the sealed edges thereof.

15. The pouch of claim 14 comprising a notch in one of the sealed edges thereof.

* * * * *